No. 725,762. PATENTED APR. 21, 1903.
N. NILSON.
WHEEL FOR PLANTERS.
APPLICATION FILED AUG. 30, 1902.
NO MODEL.
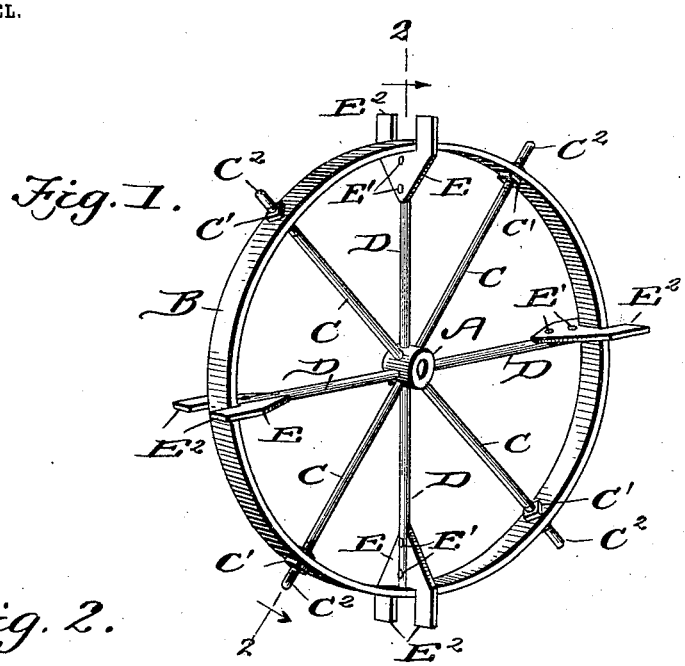
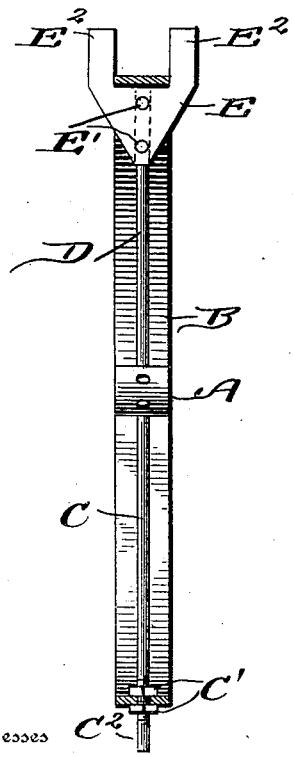
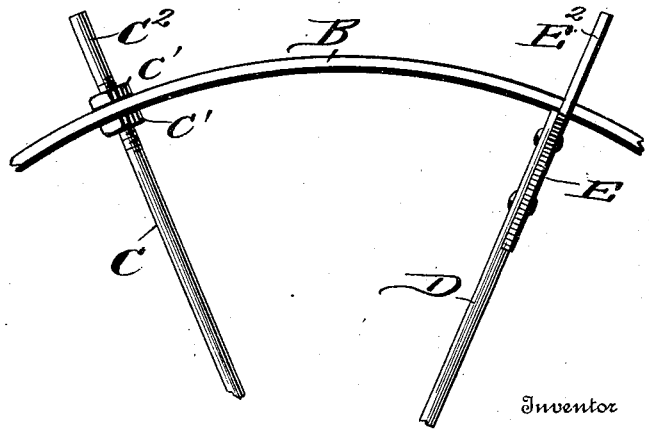
Inventor
Nils Nilson.
Witnesses
Attorneys

UNITED STATES PATENT OFFICE.

NILS NILSON, OF ABSARAKA, NORTH DAKOTA.

WHEEL FOR PLANTERS.

SPECIFICATION forming part of Letters Patent No. 725,762, dated April 21, 1903.

Application filed August 30, 1902. Serial No. 121,631. (No model.)

*To all whom it may concern:*

Be it known that I, NILS NILSON, a citizen of the United States, residing at Absaraka, in the county of Cass and State of North Dakota, have invented a new and useful Improvement in Wheels for Planters, of which the following is a specification.

This invention relates generally to cornplanters, and more particularly to certain improvements in the marking or pacing wheels employed in connection with corn-planters for the purpose of marking the ground and also operating the feed-drop.

The object of the invention is to provide certain improvements by means of which the planter will run easier and will be more easily operated, and in consequence the durability of the planter will be materially increased.

With these objects in view the invention consists of the novel features of construction, combination, and arrangement, all of which will be fully described hereinafter and pointed out in the claims.

In the drawings forming a part of this specification, Figure 1 is a perspective view showing my improved construction of wheel. Fig. 2 is a detail sectional view on the line 2 2 of Fig. 1. Fig. 3 is an enlarged detail in side elevation.

In constructing a wheel in accordance with my invention I employ a hub A and a rim B, both of which may be of any desired construction. Radiating from the hub A are a series of spokes C, which pass through the rim and are secured by means of nuts $C'$, screwed upon the spokes and upon opposite sides of the rim. Spokes D also extend from the hub A to the rim B, said spokes D being arranged alternately between spokes C. A blade E is attached to each spoke B, at the outer end thereof and upon the inner side of the rim B. These blades may be secured in any desired manner; but in the present instance I have shown them secured by bolts or rivets $E'$, which pass through the blade and also through the spoke D. The side edges are made tapering within the rim, as most clearly shown. Each blade is bifurcated, as shown, the rim B resting within the bifurcation, and the members $E^2$ project beyond the rim upon both sides a distance equal to the length of the portion $C^2$ of the spoke C projecting beyond the rim B.

A wheel constructed as herein shown and described will effectively mark the ground and will prevent the tripping-blade passing too far into the ground, and owing to the construction and arrangement of said blades the operation of the machine as a whole will be rendered easier and more accurate.

While I have shown the rim B as made up from a flat band, it is obvious that it may be constructed in any desired manner.

Having thus fully described my invention, what I claim as new, and desire to secure by Letters Patent, is—

1. A wheel of the kind described comprising a rim and a plurality of bifurcated blades secured upon the inner sides of the rim said rim resting within the bifurcation, as specified.

2. A wheel of the kind described comprising a hub and rim, a series of spokes projecting through the rim, and a series of spokes extending to the rim, said spokes extending to the rim carrying blades, the outer edges of which extend beyond the rim, as specified.

3. A wheel of the kind described comprising a hub and rim, a series of spokes extending from the hub through the rim, the nuts arranged upon opposite sides of the rim, the spokes extending from the hub to the rim and the bifurcated blades secured to last-mentioned spokes, the rim resting in the bifurcation and the members projecting beyond the rim, as specified.

NILS NILSON.

Witnesses:
  H. G. SCOTT,
  D. R. GLASGOW.